(12) United States Patent
Lee et al.

(10) Patent No.: US 11,039,355 B2
(45) Date of Patent: *Jun. 15, 2021

(54) METHOD AND APPARATUS FOR PERFORMING USER EQUIPMENT AUTONOMOUS RESOURCE RESELECTION BASED ON COUNTER IN WIRELESS COMMUNICATION SYSTEM

(71) Applicant: LG ELECTRONICS INC., Seoul (KR)

(72) Inventors: Youngdae Lee, Seoul (KR); Hanbyul Seo, Seoul (KR); Sunyoung Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,161

(22) Filed: Oct. 1, 2019

(65) Prior Publication Data

US 2020/0037216 A1 Jan. 30, 2020

Related U.S. Application Data

(63) Continuation of application No. 15/694,584, filed on Sep. 1, 2017, now Pat. No. 10,448,295, which is a
(Continued)

(30) Foreign Application Priority Data

Jul. 27, 2017 (KR) .................. 10-2017-0095323
Jul. 27, 2017 (KR) .................. 10-2017-0095348

(51) Int. Cl.
*H04W 36/06* (2009.01)
*H04W 72/02* (2009.01)
(Continued)

(52) U.S. Cl.
CPC ............. *H04W 36/06* (2013.01); *H04W 4/40* (2018.02); *H04W 4/70* (2018.02);
(Continued)

(58) Field of Classification Search
CPC ....... H04W 4/70; H04W 36/03; H04W 36/30; H04W 36/06; H04W 36/0083; H04W 72/02; H04W 72/044; H04W 84/18
See application file for complete search history.

(56) References Cited

U.S. PATENT DOCUMENTS 10,448,295 B2 * 10/2019 Lee ..................... H04W 4/40
2007/0183320 A1 8/2007 Chen et al.
(Continued)

FOREIGN PATENT DOCUMENTS

WO 2015142082 9/2015

OTHER PUBLICATIONS

Japan Patent Office Application No. 2019-507760, Office Action dated Jan. 21, 2020, 4 pages.
(Continued)

*Primary Examiner* — Benjamin H Elliott, IV
(74) *Attorney, Agent, or Firm* — Lee Hong Degerman Kang Waimey

(57) ABSTRACT

In a wireless communication system, a user equipment (UE) may reselect a sidelink resource to be used for vehicle-to-everything (V2X) communication. The reselection of sidelink resource may be triggered by various conditions. In particular, the reselection of the sidelink resources may be triggered when a value of sidelink resource reselection counter is zero. More specifically, the UE determines that data for the V2X communication is available in a sidelink traffic channel (STCH), determines that a value of the sidelink resource reselection counter is zero, and reselects the sidelink resources.

12 Claims, 6 Drawing Sheets

Related U.S. Application Data continuation of application No. PCT/KR2017/008729, filed on Aug. 11, 2017.

(60) Provisional application No. 62/373,997, filed on Aug. 12, 2016, provisional application No. 62/374,019, filed on Aug. 12, 2016.

(51) Int. Cl.
  *H04W 4/70* (2018.01)
  *H04W 36/00* (2009.01)
  *H04W 4/40* (2018.01)
  *H04W 72/04* (2009.01)
  *H04W 36/30* (2009.01)
  *H04W 84/18* (2009.01)

(52) U.S. Cl.
  CPC . *H04W 36/0083* (2013.01); *H04W 36/00837* (2018.08); *H04W 72/02* (2013.01); *H04W 36/03* (2018.08); *H04W 36/30* (2013.01); *H04W 72/044* (2013.01); *H04W 84/18* (2013.01)

(56) References Cited

U.S. PATENT DOCUMENTS

| | | |
|---|---|---|
| 2016/0219620 A1 | 7/2016 | Lee et al. |
| 2016/0249307 A1 | 8/2016 | Thangarasa et al. |
| 2017/0048905 A1 | 2/2017 | Yun et al. |
| 2017/0134080 A1 | 5/2017 | Rahman et al. |
| 2017/0188391 A1 | 6/2017 | Rajagopal et al. |
| 2017/0215119 A1 | 7/2017 | Hong et al. |
| 2017/0272384 A1 | 9/2017 | Lee et al. |
| 2017/0367100 A1 | 12/2017 | Sorrentino et al. |
| 2018/0048498 A1 | 2/2018 | Stern-Berkowitz et al. |
| 2018/0049084 A1 | 2/2018 | Lee et al. |
| 2018/0049097 A1 | 2/2018 | Chen et al. |
| 2020/0037216 A1* | 1/2020 | Lee ................ H04W 72/02 |

OTHER PUBLICATIONS

Ericsson, "Correction of prioritization during sidelink discovery gaps", 3GPP TSG RAN WG2 Meeting #93, R2-161471, Feb. 2016, 3 pages.

Intel, "Discussion on Resource Reselection Triggers for V2V", 3GPP TSG RAN WG1 Meeting #85, R1-164138, May 2016, 7 pages.

Nokia, et al., "On resource pool design", 3GPP TSG RAN WG1 Meeting #84bis, R1-162541, Apr. 2016, 4 pages.

European Patent Office Application Serial No. 17839849.1, Search Report dated Feb. 24, 2020, 11 pages.

RAN WG1, "LS on RAN1 agreements potentially related to RAN2 in sidelink-based V2V", 3GPP TSG RAN WG2 Meeting #95, R2-164606 (R1-165965), Aug. 2016, 4 pages.

U.S. Appl. No. 15/694,584, Notice of Allowance dated Jun. 7, 2019, 9 pages.

U.S. Appl. No. 15/694,584, Office Action dated Jan. 18, 2019, 20 pages.

STIC NPL search, May 30, 2019, 1 page.

IQ.IP.com Patents, May 30, 2019, 4 pages.

IQ.IP.com NPL, May 30, 2019, 1 page.

PCT International Application No. PCT/KR2017/008729, International Search Report dated Nov. 22, 017, 3 pages.

Ericsson, "Resource Reselection", 3GPP TSG RAN WG1 Meeting #85, R1-165263, May 2016, 6 pages.

Zte, "Discussion on V2V resource reselection", 3GPP TSG RAN WG1 Meeting #85, R1-164962, May 2016, 5 pages.

LG Electronics, "Discussion on details of resource reselection for PC5 based V2V", 3GPP TSG RAN WG1 Meeting #85, R1-164512, May 2016, 5 pages.

Samsung, "Triggering conditions for resource reselection", 3GPP TSG RAN WG1 Meeting #85, R1-164760, May 2016, 6 pages.

* cited by examiner

METHOD AND APPARATUS FOR PERFORMING USER EQUIPMENT AUTONOMOUS RESOURCE RESELECTION BASED ON COUNTER IN WIRELESS COMMUNICATION SYSTEM

CROSS-REFERENCE TO RELATED APPLICATIONS

This application is a continuation of U.S. patent application Ser. No. 15/694,584, filed on Sep. 1, 2017, now U.S. Pat. No. 10,448,295, which is a continuation of International Application PCT/KR2017/008729, with an international filing date of Aug. 11, 2017, which claims the benefit of earlier filing date and right of priority to Korean Patent Application Nos. 10-2017-0095323, filed on Jul. 27, 2017 and 10-2017-0095348, filed on Jul. 27, 2017 and also claims the benefit of U.S. Provisional Patent Application Nos. 62/373,997, filed on Aug. 12, 2016, and 62/374,019, filed on Aug. 12, 2016, the contents of which are all incorporated by reference herein in their entirety

BACKGROUND OF THE INVENTION

Field of the Invention

The present invention relates to a wireless communication, more specifically, to a method and apparatus for performing a user equipment (UE) autonomous resource reselection based on a counter in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink (SL) resource allocation, physical layer structure, and synchronization.

A user equipment (UE) may autonomously select SL resources for V2X communication within the resource pool configured by the network. Therefore, a method for selecting or reselecting SL resources for V2X communication needs to be discussed.

SUMMARY OF THE INVENTION

The present invention provides a method and apparatus for performing a user equipment (UE) autonomous resource reselection based on a counter in a wireless communication system. The present invention provides a method and apparatus for a UE autonomously to select and/or reselect sidelink (SL) resources for vehicle-to-everything (V2X) communication according to a value of SL resource reselection counter.

In an aspect, a method for reselecting a sidelink resource by a user equipment (UE) in a wireless communication system is provided. The method includes determining that data for vehicle-to-everything (V2X) communication is available in a sidelink traffic channel (STCH), determining that a value of sidelink resource reselection counter is zero, and reselecting the sidelink resource.

The method may further include randomly selecting a value between 5 and 15 with equal probability for the sidelink resource reselection counter, and setting the value of the sidelink resource reselection counter to the selected value. The value of the sidelink resource reselection counter may be decreased by 1 when a hybrid automatic repeat request (HARQ) transmission of each transport block (TB) of data for the V2X communication is completed.

Additionally, the method may further include determining a number of HARQ retransmissions within a range configured by an upper layer. The method may further include determining an amount of frequency resources within a range configured by an upper layer. The reselecting the sidelink resource may include randomly selecting time and frequency resources from a resource pool indicated from a physical layer.

In another aspect, a user equipment (UE) in a wireless communication system is provided. The UE include a memory, a transceiver, and a processor, coupled to the memory and the transceiver, that determines that data for vehicle-to-everything (V2X) communication is available in a sidelink traffic channel (STCH), determines that a value of sidelink resource reselection counter is zero, and reselects the sidelink resource.

DESCRIPTION OF EXEMPLARY EMBODIMENTS

Figure 1:
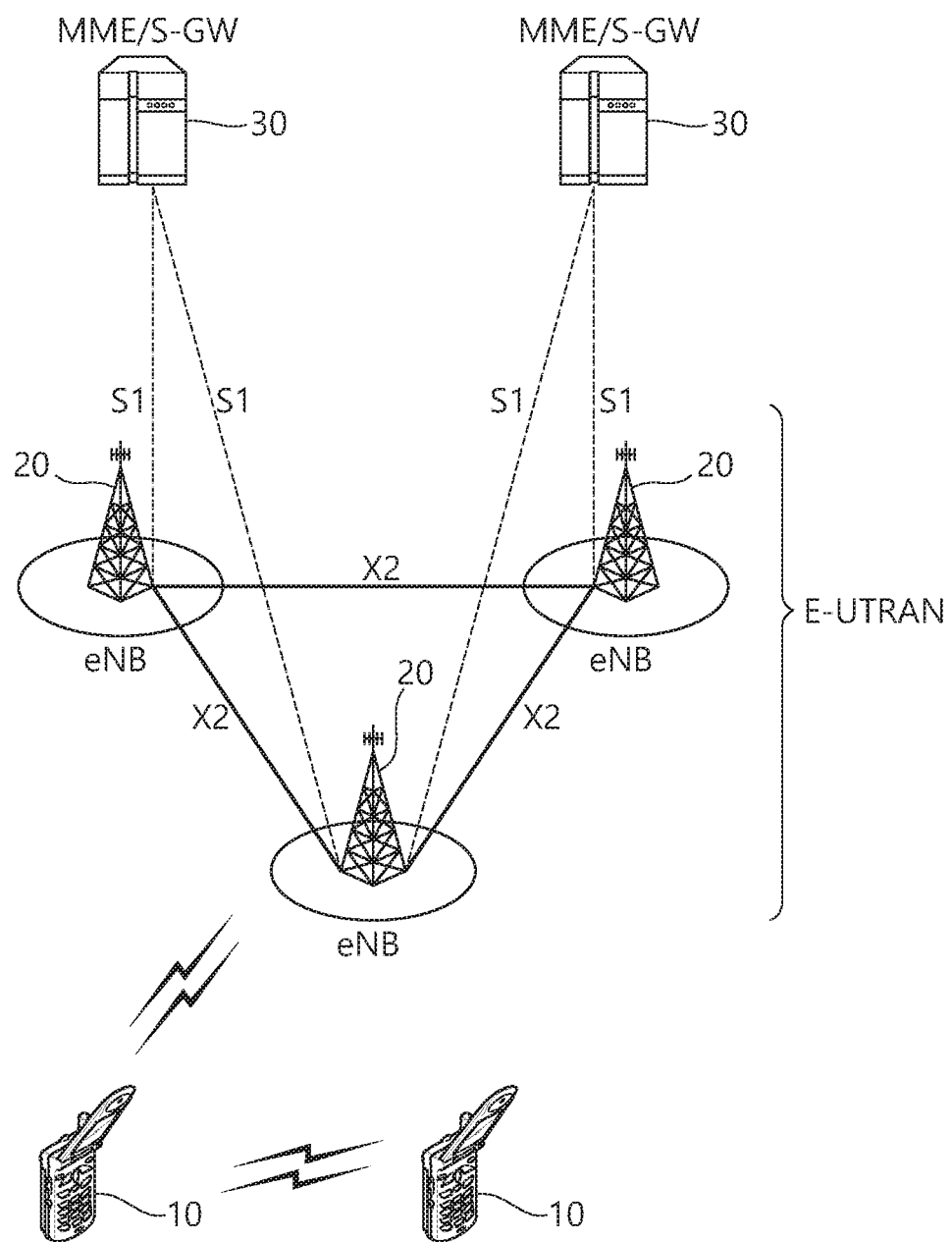
FIG. 1 shows 3GPP LTE system architecture

FIG. 1 shows 3GPP LTE system architecture. Referring to FIG. 1, the 3GPP LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
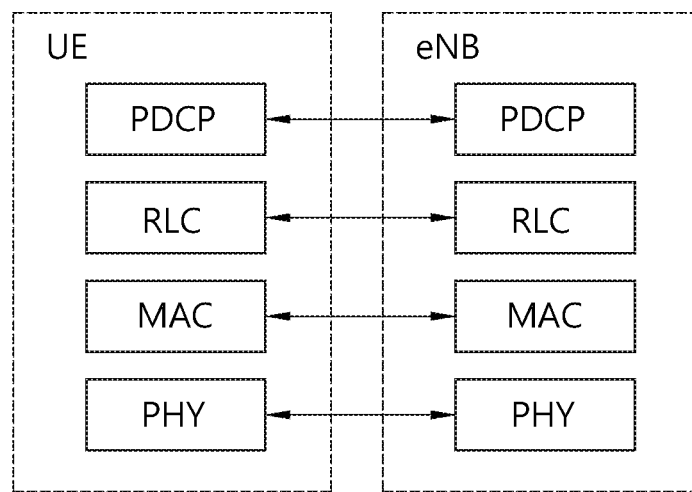
FIG. 2 shows a block diagram of a user plane protocol stack of an LTE system.
Figure 3:
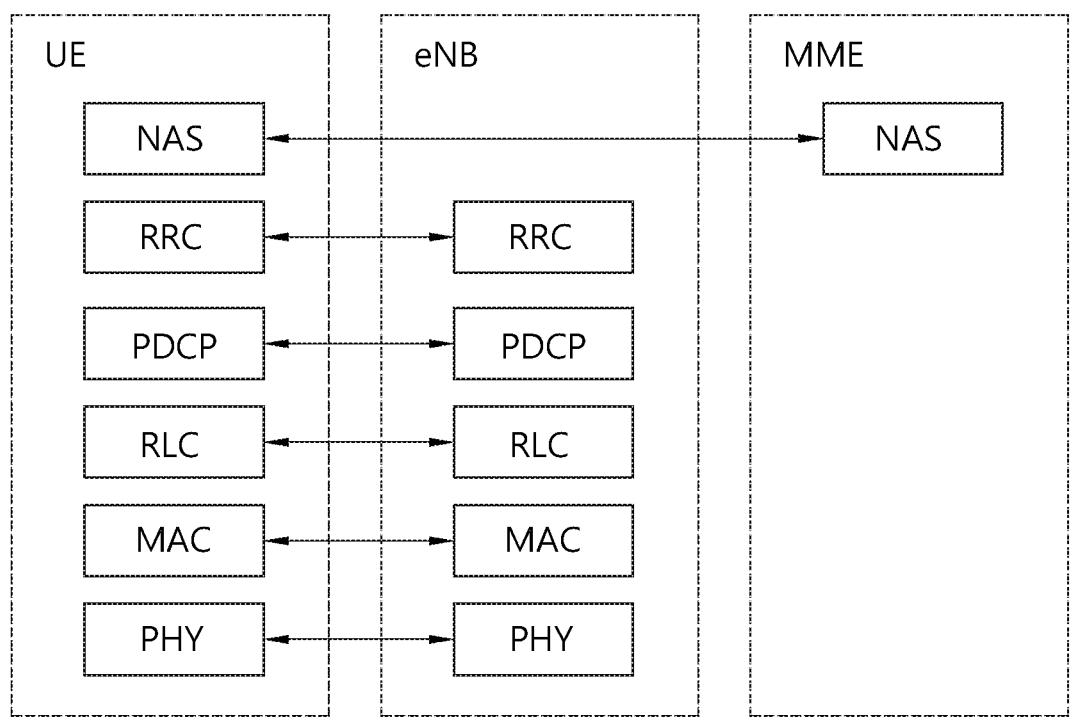
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channel includes a sidelink broadcast control channel (SBCCH) which is a sidelink channel for broadcasting sidelink system information from one UE to other UE(s). The SBCCH is mapped to the SL-BCH. The sidelink traffic channel includes a sidelink traffic channel (STCH) which is a point-to-multipoint channel, for transfer of user information from one UE to other UEs. The STCH is mapped to the SL-SCH. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

The UE supporting sidelink communication can operate in two modes for resource allocation. The first mode is a scheduled resource allocation. The scheduled resource allocation may be referred to Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource allocation. The UE autonomous resource allocation may be referred to Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A UE is considered in-coverage for sidelink communication whenever it detects a cell on a public safety ProSe carrier. If the UE is out of coverage for sidelink communication, it can only use Mode 2. If the UE is in coverage for sidelink communication, it may use Mode 1 or Mode 2 as per eNB configuration. If the UE is in coverage for sidelink communication, it shall use only Mode 1 indicated by eNB configuration unless one of the exceptional cases occurs. When an exceptional case occurs, the UE is allowed to use Mode 2 temporarily even though it was configured to use Mode 1. Resource pool to be used during exceptional case may be provided by eNB.

The cell on the public safety ProSe carrier may select one of the following options. The cell on the public safety ProSe carrier may provide a transmission resource pool for Mode 2 in SIB18. UEs that are authorized for sidelink communication may use these resources for sidelink communication in RRC_IDLE in the cell on the same carrier (i.e. public safety ProSe carrier). UEs that are authorized for sidelink communication may use these resources for sidelink communication in RRC_IDLE or RRC_CONNECTED in a cell on another carrier.

Alternatively, the cell on the public safety ProSe carrier may indicate in SIB18 that it supports sidelink communication but does not provide transmission resources. UEs need to enter RRC_CONNECTED to perform sidelink communication transmission. In this case the cell on the public safety ProSe carrier may provide in broadcast signalling an exceptional transmission resource pool for Mode 2, to be used by the UE in exceptional cases. A UE in RRC_CONNECTED that is authorized to perform sidelink communication transmission indicates to the serving eNB that it wants to perform sidelink communication transmissions. The eNB validates whether the UE is authorized for sidelink communication transmission using the UE context received from MME. The eNB may configure a UE by dedicated signalling with a transmission resource pool for Mode 2. That may be used without constraints while the UE is in RRC_CONNECTED. Alternatively, the eNB may configure a UE to use the exceptional transmission resource pool for Mode 2 which the UE is allowed to use only in exceptional cases, and rely on Mode 1 otherwise.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery the allowed frequency is pre-configured in the UE, and is used even when UE is out of coverage of EUTRA in that frequency. The pre-configured frequency is the same frequency as the public safety ProSe carrier.

There are two types of resource allocation for discovery message announcement. The first type is UE autonomous resource selection which is a resource allocation procedure where resources for announcing of discovery message are allocated on a non UE specific basis. The UE autonomous resource selection may be referred to Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for Type 1 based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g. RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g. RSU, application server, etc.

In V2X communication, messages such as common awareness messages (CAM), decentralized environmental notification messages (DENM), or basic safety messages (BSM) may be transmitted. The CAM includes information such as the type, position, speed, and direction of the vehicle, and may be periodically broadcast by all vehicles. The DENM includes information such as the type of a specific event, the region where a specific event occurred, etc., and may be broadcast by an RSU or a vehicle. The BSM is included in the US J2735 safety message and has features similar to CAM. The BSM may provide emergency brake warning, front collision warning, intersection safety support, blind spot and lane change warning, overtaking warning, and out of control warning service.

The UE may autonomously select SL resources for V2X communication within the resource pool configured by the network. That is, the UE may select the SL resource for V2X communication in Mode 2 autonomously and perform V2X communication via the corresponding SL resource. However, SL resources for V2X communication may be selected based on sensing. More specifically, the UE may perform sensing for (re)selection of SL resources. Based on the sensed result, the UE (re)select specific SL resources, and reserve a plurality of SL resources. The UE autonomous resource selection based on sensing for V2X communication may be referred to as V2V mode 2 or Mode 4.

Many discussions are under way to select and/or reselect SL resources. Hereinafter, various aspects of SL resources for V2X communication will be described in accordance with various embodiments of the present invention.

1. SL Resource Reselection Trigger Condition

For conditions that trigger resource reselection in V2V mode 2 or Mode 4, the followings may be proposed. A reselection may be triggered if any of the following conditions are met. When the resource reselection is triggered may be specified in the MAC layer.

(1) If a counter meets an expiration condition, the MAC layer may trigger SL resource reselection. A new resource counter, SL resource reselection counter (SL_RESOURCE_RESELECTION_COUNTER) may be introduced for resource reselection. If the value of the SL resource reselection counter is zero, then the MAC layer may trigger resource reselection. When the resource reselection is triggered, the UE may randomly select a value between 5 and 15 with the equal probability for the SL resource reselection counter. That is, the SL resource reselection counter may be reset if the reselection is triggered for all semi-permanently selected resources. The value of the sidelink resource reselection counter may be decreased by 1, when a hybrid automatic repeat request (HARQ) transmission of each transport block (TB) of data for the V2X communication is completed. More specifically, if the value of RETX_NUMBER_SLSCH indicating the number of retransmissions of the SL-SCH is equal to the number of HARQ retransmissions, the value of the SL resource reselecting counter may be decreased by 1.

(2) If the current SL grant cannot accommodate a TB using the maximum allowed MCS within a range configured by an upper layer, the MAC layer may trigger the SL resource reselection. That is, the UE may use the maximum allowed MCS to identify that the TB is not appropriate within the current resource allocation and trigger the SL resource reselection.

(3) If one or more resource pool is (re)configured by the RRC, the MAC layer may trigger the SL resource reselection. The eNB may implicitly trigger reselection whenever the resource pool configuration changes. Dedicated signaling may be used for the UE in RRC_CONNECTED, and broadcast signaling may be used for the UE in RRC_IDLE.

Table 1 shows an embodiment of the operation of UE for the SL resource selection and reselection, in which the above mentioned SL resource reselection trigger conditions are incorporated.

TABLE 1

For V2X communication, if data is available in a STCH for transmission on the SL-SCH, the MAC entity shall:
1> If SL RESOURCE_RESELECTION_COUNTER = 0; or
1> If the current sidelink grant cannot accommodate a transport block using the maximum allowed MCS in the range configured by upper layers; or
1> If one or more resource pools is (re-)configured by upper layers;
2> randomly select, with equal probability, a value between 5 and 15 and sets SL_RESOURCE_RESELECTION_COUNTER to the selected value.

2. Resource Reselection Considering Delay Requirements

The generation time of the periodic message may be adjusted with time. This adjustment affects the delay, and thus the UE may send assistance information including the period and time offset for the SL semi-persistent scheduling (SPS) operation. This assistance information may trigger the reactivation of the SL SPS to meet the delay requirements.

Meanwhile, in V2V mode 2 or Mode 4, the UE selects time and frequency resources from the resource pool selected for periodic transmission of V2X messages, e.g. occurring every 100 ms. Then, the UE determines subset of subframes in which the TB is transmitted for each TB which is likely to correspond to a V2X message. Thus, similar to the SL SPS, a change in message generation time may need to trigger a resource reselection to satisfy the delay requirement. That is, a change in the message generation time may be considered as an additional trigger condition for resource reselection. Thus, the reselection may be triggered if the SL grant does not satisfy the delay requirement for TB.

For example, when the CAM message generation time is adjusted to a time of +30 ms with the same period (e.g. 100 ms), the UE may reselect the time and frequency resources from the selected resource pool. Also, when the period of the CAM message changes from 100 ms to 500 ms, the UE may reselect the time and frequency resources from the selected resource pool according to the new period.

Table 2 shows an embodiment of the operation of UE for the SL resource selection and reselection, considering the above mentioned delay requirements.

TABLE 2

For V2X communication, if data is available in a STCH for transmission on the SL-SCH, the MAC entity shall:
1> if SL RESOURCE_RESELECTION_COUNTER = 0; or
1> if the sidelink grant cannot accommodate a transport block by using the maximum allowed MCS in the range configured by upper layers; or
1> if one or more pools of resources are (re-)configured by upper layers; or
1> if the sidelink grant cannot meet the latency requirement for the transport block;
2> randomly select, with equal probability, a value between 5 and 15 and sets SL_RESOURCE_RESELECTION_COUNTER to the selected value;

Meanwhile, the UE may perform sensing during a specific period between the subframe 'n−a' and the subframe 'n−b', perform resource selection in the subframe 'n' and transmit a scheduling assignment (SA) in the subframe 'n+c' to indicate the subsequent data transmission in the subframe 'n+d'. More specifically, when resource selection/reselection is triggered at TTI 'n' in V2V mode 2 or Mode 4, the UE may perform sensing at least at TTI 'n−a' and TTI 'n−b', where, a and b are integers, a>b>0, and a and b may be common to all V2V UEs. The UE may select a time-frequency resource for the PSSCH. In addition, in V2V mode 2 or Mode 4, the UE may transmit, in the TTI 'n+c', an SA indicating related data to be transmitted in the TTI 'n+d', where, c and d are integers and c<d. In addition, the UE may indicate whether to reuse the signaled frequency resource for transmission in the TTI 'n+d' for potential transmission of another TB in the TTI 'n+e', where, e is an integer, and d<e.

That is, the V2V delay in SL is determined as 'n+d'. Therefore, when the UE performs a resource selection/reselection, the UE needs to confirm that the selected SL grant satisfies the V2V delay requirement (i.e. 100 ms) considering the time at which the message reaches the AS layer. That is, the UE should select time and frequency resources for the SL-SCH and SL control information (SCI) of the SL grant that satisfy the delay requirement, considering the time at which the message reaches the AS layer.

The physical layer may determine a candidate resource based on sensing (by excluding unavailable resources) from a pool of resources selected by the MAC layer. Then, the MAC layer randomly selects the time and frequency resources for the SCI and the SL-SCH of the SL grant. Since the delay requirements should be satisfied for each TB (i.e. one message), the physical layer should be able to provide only candidate resources that can satisfy the delay requirement. Otherwise, the physical layer may only provide candidate resources that cannot satisfy the delay requirement. Thus, the MAC layer may determine the maximum allowed PSSCH transmission time that satisfies the delay requirement (i.e. d_max) for each TB. Then, the physical layer may provide the MAC layer only with the candidate resource that can satisfy the delay requirement based on the maximum allowed PSSCH transmission time.

Table 3 shows an embodiment of the operation of the UE for the SCI transmission and the SL grant reception, considering the maximum allowed PSSCH transmission time.

TABLE 3 if the MAC entity is configured by upper layers to transmit using one or multiple pool(s) of resources, the MAC entity shall for transmission of each transport block:
...
select a MCS within the range configured by upper layers;
determine the maximum allowed PSSCH transmission time that meets the latency requirement;
perform the sidelink resource selection and reselection if triggered.

Table 4 shows an embodiment of the operation of the UE for SL resource selection and reselection, considering the maximum allowed PSSCH transmission time.

TABLE 4

For V2X communication, if data is available in a STCH for transmission on the SL-SCH, the MAC entity shall:
1> if SL_RESOURCE_RESELECTION_COUNTER = 0; or
1> if the current sidelink grant cannot accommodate a transport block by using the maximum allowed MCS in the range configured by upper layers; or
1> if one or more pools of resources are (re-)configured by upper layers;
2> randomly select, with equal probability, a value between 5 and 15 and sets SL_RESOURCE_RESELECTION_COUNTER to the selected value;
2> determine the number of HARQ retransmissions within the range configured by upper layers, and an amount of frequency resources within the range configured by upper layers.
2> randomly select the time and frequency resources for SL-SCH and SCI of a sidelink grant from the selected resource pool, except the resources excluded by the physical layer with the determined maximum allowed PSSCH transmission time. The random function shall be such that each of the allowed selections can be chosen with equal probability;

3. Resource Selection and Reselection for Each Logical Channel

The SCI may explicitly include priority information. This priority information may be used for sensing based resource selection. While, one logical channel may be used to carry a CAM message with a relatively low priority, the other logical channel may be used to carry a DENM message with a relatively high priority. Thus, one SCI and its associated data transmission may be used for either the CAM message or the DENM message.

This resource (re)selection and transmission mechanisms may work well when the SL grant is selected for each logical channel. That is, one resource (re)selection and transmission procedure for the CAM and another resource (re)selection and transmission procedure for the DEN may be performed in parallel. Thus, in the V2V mode 2 or Mode 4, the SL grant reception and SCI transmission procedure and the SL resource selection and reselection procedure may occur for each logical channel.

Table 5 shows an embodiment of the UE operation, considering each of the above-mentioned logical channels.

TABLE 5

For V2X communication, sidelink grants are selected for each sidelink logical channel as follows:
if the MAC entity is configured by upper layers to transmit using one or multiple pool(s) of resources, the MAC entity shall for transmission of each transport block:
...

4. Resource Pool Selection

In the conventional MAC procedure, if the MAC entity is configured to transmit using one or more resource pools by an upper layer, the MAC layer may select a resource pool to be used from the resource pool configured by the RRC layer. This cross-layer operation may be performed for V2X communication.

In addition, region-based resource pool selection for V2X communication may be introduced. Thus, if the UE determines a region in which the UE is located, the UE may select a resource pool corresponding to the region. The region may be determined by an upper layer rather than by the MAC layer. The MAC layer may be informed of the region determined by the upper layer.

Table 6 show an embodiment of UE operation for the above-mentioned resource pool selection.

TABLE 6

For V2X communication, sidelink grants are selected as follows:
1> if the MAC entity is configured by upper layers to transmit using one or multiple pool(s) of resources, the MAC entity shall for transmission of each transport block:
2> if configured by upper layers to use a single pool of resources:
3> select that pool of resources for use;
2> else, if configured by upper layers to use multiple pools of resources with a zone:
3> select a pool of resources for use from the pools of resources configured by upper layers which corresponds to the zone indicated by upper layers.
2> select a MCS within the range configured by upper layers;
2> perform the sidelink resource selection and reselection if triggered;
2> use the selected sidelink grant to determine the set of subframes in which transmission of SCI and transmission of the transport block occur;
2> consider the selected sidelink grant to be a configured sidelink grant;
2> deliver the configured sidelink grant and the associated HARQ information to the Sidelink HARQ entity for this TTI.

5. Resource Reselection Triggered by UL Transmission or ProSe Discovery

V2V transmissions may not occur when overlapping with UL transmissions or discovery transmissions. Thus, resource reselection may be triggered by UL transmission or ProSe discovery. Table 7 shows an embodiment of the operation of UE for SL resource selection and reselection, considering the above mentioned UL transmission or ProSe discovery.

TABLE 7

For V2X communication, if data is available in a STCH for transmission on the SL-SCH, the MAC entity shall:
1> if there is uplink transmission at the time of the transmission and if the MAC entity is unable to perform uplink transmissions and transmissions on SL-SCH simultaneously at the time of the transmission; or
1> if there is transmission or reception on PSDCH at the time of the transmission; or
1> if there is a sidelink discovery gap for transmission at the time of transmission:
2> the UE shall trigger resource selection or reselection for each TTI, for each subframe or for each transmission of a transport block as follows:
2> randomly select, with equal probability, a value between 5 and 15 and sets SL_RESOURCE_RESELECTION_COUNTER to the selected value;
2> determine the number of HARQ retransmissions within the range configured by upper layers, and an amount of frequency resources within the range configured by upper layers;
2> randomly select the time and frequency resources for SL-SCH and SCI of a sidelink grant from the selected resource pool, except the resources excluded by the physical layer with the determined maximum allowed PSSCH transmission time.The random function shall be such that each of the allowed selections can be chosen with equal probability;
2> use the selected sidelink grant to determine the set of subframes in which transmission of SCI and transmission of the transport block occur;
2> consider the selected sidelink grant to be a configured sidelink grant;
2> deliver the configured sidelink grant and the associated HARQ information to the Sidelink HARQ entity for this TTI.

6. Resource Reselection Except for Resources Overlapping with UL Transmission or SL Discovery V2V transmissions may not occur when overlapping with the UL transmissions or discovery transmissions. Thus, the UE may perform resource reselection except for resources overlapping with the UL transmission or SL discovery. Table 8 show an embodiment of the operation of the UE for the SL resource selection and reselection, considering the above mentioned UL transmission or SL discovery.

TABLE 8

If resource selection or reselection is triggered, the UE (desirably at the physical layer) shall (desirably for a logical channel):
1> select a pool of resources (if multiple pools are configured by eNB);
1> excludes the resources where there is uplink transmission, the resources where there is transmission or reception on PSDCH, and the resources where there is a sidelink discovery gap for transmission;
1> randomly select the time and frequency resources for SL-SCH and SCI of a sidelink grant from the selected resource pool, except the excluded resources;
1> use the selected sidelink grant to determine the set of subframes in which transmission of SCI and transmission of the transport block occur;
1> consider the selected sidelink grant to be a configured sidelink grant;
1> deliver the configured sidelink grant and the associated HARQ information to the Sidelink HARQ entity for this TTI.

Figure 4:
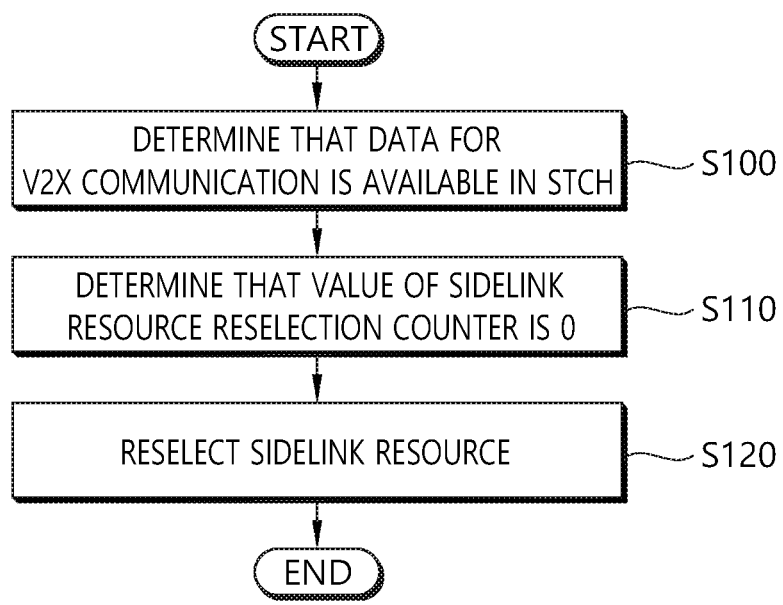
FIG. 4 shows a method for reselecting sidelink resources by a UE according to an embodiment of the invention.

FIG. 4 shows a method for reselecting sidelink resources by a UE according to an embodiment of the invention. The description of the present invention described above may be applied to this embodiment.

In the step S100, the UE determines that data for V2X communication is available in a STCH. In the step S110, the UE determines that a value of sidelink resource reselection counter is zero. In the step S120, the UE reselects the sidelink resource.

Upon reselecting the sidelink resource, then the UE may randomly selects a value between 5 and 15 with equal probability for the sidelink resource reselection counter, and set the value of the sidelink resource reselection counter as the selected value. When a HARQ transmission of each TB of data for the V2X communication is completed, the value of the sidelink resource reselection counter may be decreased by 1.

In addition, upon reselecting the sidelink resource, then the UE may determine the number of HARQ retransmissions within a range configured by an upper layer. The UE may determine an amount of frequency resources within a range configured by the upper layer. The reselecting the sidelink resource may include randomly selecting time and frequency resources from a resource pool indicated from a physical layer.

The resource pool indicated from the physical layer may not include resources excluded by the physical layer according to the delay requirement of the V2X communication. The resources excluded by the physical layer may be determined according to the maximum allowed PSSCH transmission time. The sidelink resource reselection may be performed for each sidelink logical channel.

Figure 5:
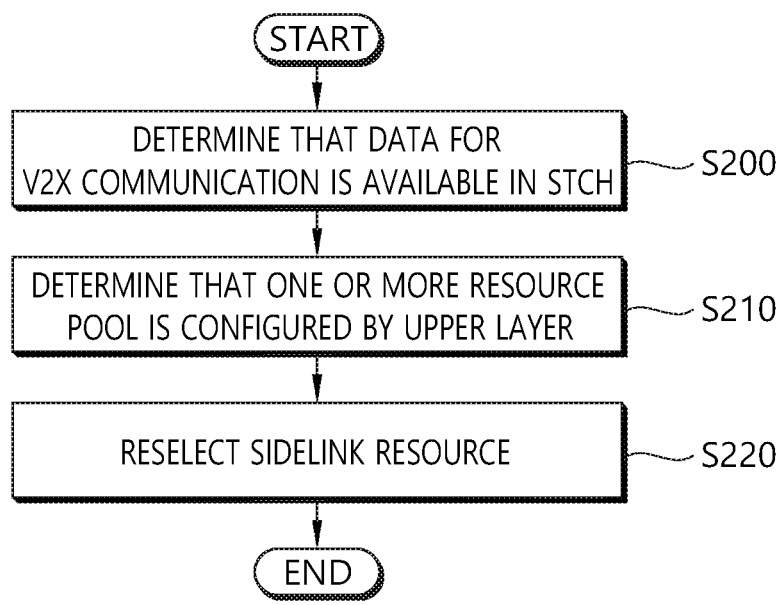
FIG. 5 shows a method for reselecting sidelink resources by a UE according to another embodiment of the invention.

FIG. 5 shows a method for reselecting sidelink resources by a UE according to another embodiment of the invention. The description of the present invention described above may be applied to this embodiment.

In the step S200, the UE determines that data for V2X communication is available in a STCH. In the step S210, the UE determines that one or more resource pool is configured by an upper layer. In the step S220, the UE reselect the sidelink resource.

Upon reselecting the sidelink resource, then the UE may randomly selects a value between 5 and 15 with equal probability for the sidelink resource reselection counter, and set the value of the sidelink resource reselection counter as the selected value. When a HARQ transmission of each TB of data for the V2X communication is completed, the value of the sidelink resource reselection counter may be decreased by 1.

In addition, upon reselecting the sidelink resource, then the UE may determine the number of HARQ retransmissions within a range configured by an upper layer. The UE may determine an amount of frequency resources within a range configured by the upper layer. The reselecting the sidelink resource may include randomly selecting time and frequency resources from a resource pool indicated from a physical layer.

The resource pool indicated from the physical layer may not include resources excluded by the physical layer according to the delay requirement of the V2X communication. The resources excluded by the physical layer may be determined according to the maximum allowed PSSCH transmission time. The sidelink resource reselection may be performed for each sidelink logical channel.

Figure 6:
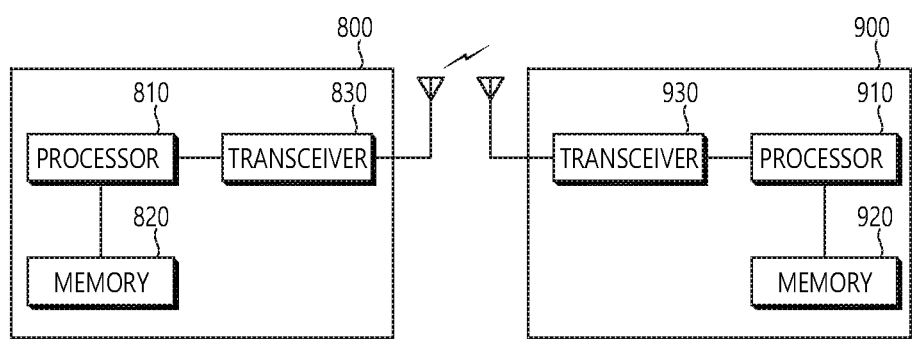
FIG. 6 shows a wireless communication system to implement an embodiment of the present invention.

FIG. 6 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g. procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, the UE can efficiently select and/or reselect the SL resource for the V2X communication.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
    based on a media access control (MAC) entity of the wireless device being configured by an upper layer to transmit using a pool of resources,
    determining that there is data in a logical channel;
    determining that a value of sidelink resource reselection counter is zero;
    selecting, from the pool of resources, sidelink resources based on the value of the sidelink resource reselection counter being zero; and
    transmitting the data based on the selected sidelink resources,
    wherein the value of the sidelink resource reselection counter is decreased by 1 upon that a hybrid automatic repeat request (HARQ) transmission of the sidelink transmission is completed.

2. The method of claim 1, wherein selecting the sidelink resources comprises:
    randomly selecting a value between 5 and 15 with equal probability for the sidelink resource reselection counter; and
    setting the value of the sidelink resource reselection counter to the selected value.

3. The method of claim 1, wherein selecting the sidelink resources comprises:
    determining a number of HARQ retransmissions within a range configured by the upper layer.

4. The method of claim 1, wherein selecting the sidelink resources comprises:
    determining an amount of frequency resources within a range configured by the upper layer.

5. The method of claim 1, wherein selecting the sidelink resources is performed for each sidelink logical channel.

6. The method of claim 1, wherein selecting the sidelink resource is performed based on sensing using the pool of resources.

7. The method of claim 1, wherein the pool of resources does not include resources excluded by a physical layer according to a delay requirement of a vehicle-to-everything (V2X) communication.

8. The method of claim 7, wherein the resources excluded by the physical layer are determined according to a maximum allowed physical sidelink shared channel (PSSCH) transmission time.

9. The method of claim 1, wherein the upper layer is a radio resource control (RRC) layer of the wireless device.

10. The method of claim 1, wherein the wireless device is in communication with at least one of a mobile device, a network, and/or autonomous vehicles other than the wireless device.

11. A wireless device configured to operate in a wireless communication system, the wireless device comprising:
    a transceiver;
    at least one processor; and
    at least one computer memory operably connectable to the at least one processor and storing instructions that, when executed by the at least one processor, perform operations that comprise:
    based on a media access control (MAC) entity of the wireless device being configured by an upper layer to transmit using a pool of resources,
    determining that there is data in a logical channel;
    determining that a value of sidelink resource reselection counter is zero;
    selecting, from the pool of resources, sidelink resources based the value of the sidelink resource reselection counter being zero; and
    transmitting the data based on the selected sidelink resources,
    wherein the value of the sidelink resource reselection counter is decreased by 1 upon that a hybrid automatic repeat request (HARQ) transmission of the sidelink transmission is completed.

12. A processor for a wireless device in a wireless communication system, wherein the processor is configured to control the wireless device to:
    based on a media access control (MAC) entity of the wireless device being configured by an upper layer to transmit using a pool of resources,
    determine that there is data in a logical channel;
    determine that a value of sidelink resource reselection counter is zero;
    select, from the pool of resources, sidelink resources based the value of the sidelink resource reselection counter being zero; and
    transmit the data based on the selected sidelink resources,
    wherein the value of the sidelink resource reselection counter is decreased by 1 upon that a hybrid automatic repeat request (HARQ) transmission of the sidelink transmission is completed.

* * * * *